(12) United States Patent
Tateishi

(10) Patent No.: US 11,245,983 B2
(45) Date of Patent: Feb. 8, 2022

(54) AUDIO PROCESSING DEVICE AND METHOD FOR ECHO CANCELLATION

(71) Applicant: SONY CORPORATION, Tokyo (JP)

(72) Inventor: Kazuya Tateishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/640,137

(22) PCT Filed: Jul. 6, 2018

(86) PCT No.: PCT/JP2018/025794
§ 371 (c)(1),
(2) Date: Feb. 19, 2020

(87) PCT Pub. No.: WO2019/044176
PCT Pub. Date: Mar. 7, 2019

(65) Prior Publication Data
US 2021/0195324 A1 Jun. 24, 2021

(30) Foreign Application Priority Data
Aug. 28, 2017 (JP) .............................. JP2017-163806

(51) Int. Cl.
*H04R 3/02* (2006.01)
*H04R 1/02* (2006.01)
*H04R 3/00* (2006.01)

(52) U.S. Cl.
CPC ............... *H04R 3/02* (2013.01); *H04R 1/021* (2013.01); *H04R 3/007* (2013.01)

(58) Field of Classification Search
CPC .... H04R 3/02; H04R 2227/001; H04R 1/021; H04R 3/007; H04M 9/082; H04M 3/002;
(Continued)

(56) References Cited

U.S. PATENT DOCUMENTS

| 7,072,465 B1* | 7/2006 | Benesty | H04B 3/234 370/286 |
| 7,333,605 B1* | 2/2008 | Zhang | H04M 9/082 370/286 |

(Continued)

FOREIGN PATENT DOCUMENTS

| AU | 9590601 A | 5/2002 |
| CN | 102025395 A | 4/2011 |

(Continued)

OTHER PUBLICATIONS

Office Action for CN Patent Application No. 20188053951 dated Jan. 22, 2021.

(Continued)

*Primary Examiner* — Norman Yu
(74) *Attorney, Agent, or Firm* — Chip Law Group

(57) ABSTRACT

Provided are an audio processing device, an audio processing method, an information processing device, and a computer program that perform echo cancellation corresponding to double talk. The audio processing device includes an estimation unit that estimates a filter representing a transmission characteristic from a speaker where a reference signal is output to a microphone in which the reference signal sneaks, an adjustment unit that adjusts a step size on the basis of a filter update coefficient estimated by the estimation unit, and an update unit that updates the filter according to the update coefficient and the step size. The adjustment unit adjusts the step size on the basis of a ratio of power of the filter update coefficient to maximum power of the filter.

14 Claims, 8 Drawing Sheets

(58) Field of Classification Search
CPC ....... G10L 2021/02082; G10L 21/0208; G10L 21/0216; G10L 25/21; G10K 11/17854; G10K 2210/505
USPC ............ 379/406.08, 406.01, 406.05; 381/66, 381/71.1, 71.11, 71.12, 94.1, 56; 455/570
See application file for complete search history.

(56) References Cited

U.S. PATENT DOCUMENTS

| | | |
|---|---|---|
| 2003/0169892 A1 | 9/2003 | Ura |
| 2011/0033059 A1 | 2/2011 | Bhaskar et al. |
| 2013/0315408 A1* | 11/2013 | Yano ................ G10K 11/17881 381/66 |

FOREIGN PATENT DOCUMENTS

| | | |
|---|---|---|
| CN | 103444094 A | 12/2013 |
| EP | 2675073 A1 | 12/2013 |
| JP | 2002-509672 A | 3/2002 |
| JP | 2008-022478 A | 1/2008 |
| JP | 2008-098929 A | 4/2008 |
| JP | 2008-141734 A | 6/2008 |
| JP | 2008-312199 A | 12/2008 |
| WO | 2002/039709 A1 | 5/2002 |
| WO | 2012/153451 A1 | 11/2012 |

OTHER PUBLICATIONS

International Search Report and Written Opinion of PCT Application No. PCT/JP2018/025794, dated Sep. 18, 2018, 10 pages of ISRWO.

Office Action for CN Patent Application No. 2018800539511, dated Jun. 4, 2021, 05 pages of Office Action and 05 pages of English Translation.

* cited by examiner

AUDIO PROCESSING DEVICE AND METHOD FOR ECHO CANCELLATION

CROSS REFERENCE TO RELATED APPLICATIONS

This application is a U.S. National Phase of International Patent Application No. PCT/JP2018/025794 filed on Jul. 6, 2018, which claims priority benefit of Japanese Patent Application No. JP 2017-163806 filed in the Japan Patent Office on Aug. 28, 2017. Each of the above-referenced applications is hereby incorporated herein by reference in its entirety.

TECHNICAL FIELD

The technology disclosed in this specification relates to an audio processing device, an audio processing method, and an information processing device that perform echo cancellation corresponding to double talk.

BACKGROUND ART

If audio or music is reproduced from a device equipped with a speaker and a microphone, the audio or the music sneaks in the microphone of the device, and an audio call or audio recognition cannot be performed correctly. There is an echo canceller, which is technology to solve this problem. An echo canceller is technology estimating a transmission characteristic that creates a composite wave of a signal reflection path up to a point where audio emitted from a device itself transmits through space and reaches a microphone, convoluting the estimated transmission characteristic into a signal reproduced by the device itself, and subtracting the estimated transmission characteristic after the audio is input to the microphone.

A transmission path in space changes depending on user environment and changes even if a human moves. Because an audio call and audio recognition require a real-time property, it is necessary to adaptively estimate a transmission characteristic that changes from moment to moment. As an estimation algorithm, least mean square (LMS) with a small amount of calculation is suitable for a real-time application. In this kind of estimation algorithm, a transmission characteristic filter is adaptively learned so as to minimize an error after echo processing. However, if double talk including a user utterance or the like at the same time in addition to audio emitted from the device itself occurs at a certain time, the learning is performed so as to minimize the error, and therefore, there is a problem that an incorrect transmission characteristic filter is estimated, a mismatch of the transmission characteristic is caused, and a (spout) phenomenon in which an echo remains uncanceled occurs.

In order to suppress deterioration of echo cancellation performance caused by double talk, an echo canceller using a double-talk determination device has been proposed (refer to, for example, Patent Document 1). A double-talk determination device has a function of recognizing a user utterance and rapidly reducing learning speed (step size) of a transmission characteristic filter when an amount of an echo remaining uncanceled increases. By utilizing the double-talk determination device to reduce the learning speed, it is possible to reduce erroneous learning during the double talk.

CITATION LIST

Patent Document

Patent Document 1: Japanese Patent Application Laid-Open No. 2008-98929

Patent Document 2: Japanese Patent Application Laid-Open No. 2008-141734

SUMMARY OF THE INVENTION

Problems to be Solved by the Invention

An object of the technology disclosed in this specification is to provide an audio processing device, an audio processing method, and an information processing device that perform echo cancellation corresponding to double talk.

Solutions to Problems

A first aspect of the technology disclosed in this specification is an audio processing device including an estimation unit that estimates a filter representing a transmission characteristic from a speaker where a reference signal is output to a microphone in which the reference signal sneaks, an adjustment unit that adjusts a step size on the basis of a filter update coefficient estimated by the estimation unit, and an update unit that updates the filter according to the filter update coefficient and the step size.

The adjustment unit adjusts the step size on the basis of a ratio of power of the filter update coefficient to maximum power of the filter. That is, the adjustment unit brings the step size close to 0 as the ratio of the power of the filter update coefficient to the maximum power of the filter increases, and brings the step size close to 1 as the ratio of the power of the filter update coefficient to the maximum power of the filter decreases.

Furthermore, a second aspect of the technology disclosed in this specification is an audio processing method including an estimation step of estimating a filter representing a transmission characteristic from a speaker where a reference signal is output to a microphone in which the reference signal sneaks, an adjustment step of adjusting a step size on the basis of a filter update coefficient estimated by the estimation step, and an update step of updating the filter according to the filter update coefficient and the step size.

Furthermore, a third aspect of the technology disclosed in this specification is an audio processing device including an estimation unit that estimates a filter representing a transmission characteristic from a speaker where a reference signal is output to a microphone in which the reference signal sneaks, and a determination unit that determines double talk on the basis of a ratio of power of a filter update coefficient estimated by the estimation unit to maximum power of the filter.

Furthermore, a fourth aspect of the technology disclosed in this specification is an information processing device including a speaker that outputs an audio signal, a microphone that receives the audio signal, an estimation unit that estimates a filter representing a transmission characteristic from the speaker where a reference signal is output to the microphone in which the reference signal sneaks, an adjustment unit that adjusts a step size on the basis of a filter update coefficient estimated by the estimation unit, an update unit that updates the filter according to the filter update coefficient and the step size, and a processing unit that performs echo cancellation or another audio signal processing by applying the filter.

Effects of the Invention

According to the technology disclosed in this specification, it is possible to provide an audio processing device, an audio processing method, and an information processing device that perform echo cancellation corresponding to double talk.

Note that the effects described in this specification are merely an example, and the effect of the present invention is not limited to this. Furthermore, there is also a case where the present invention has further additional effects in addition to the effects described above.

Other objects, features, and advantages of the technology disclosed in this specification will become apparent from a more detailed description based on the embodiment to be described later and the accompanying drawings.

MODE FOR CARRYING OUT THE INVENTION

Figure 1:
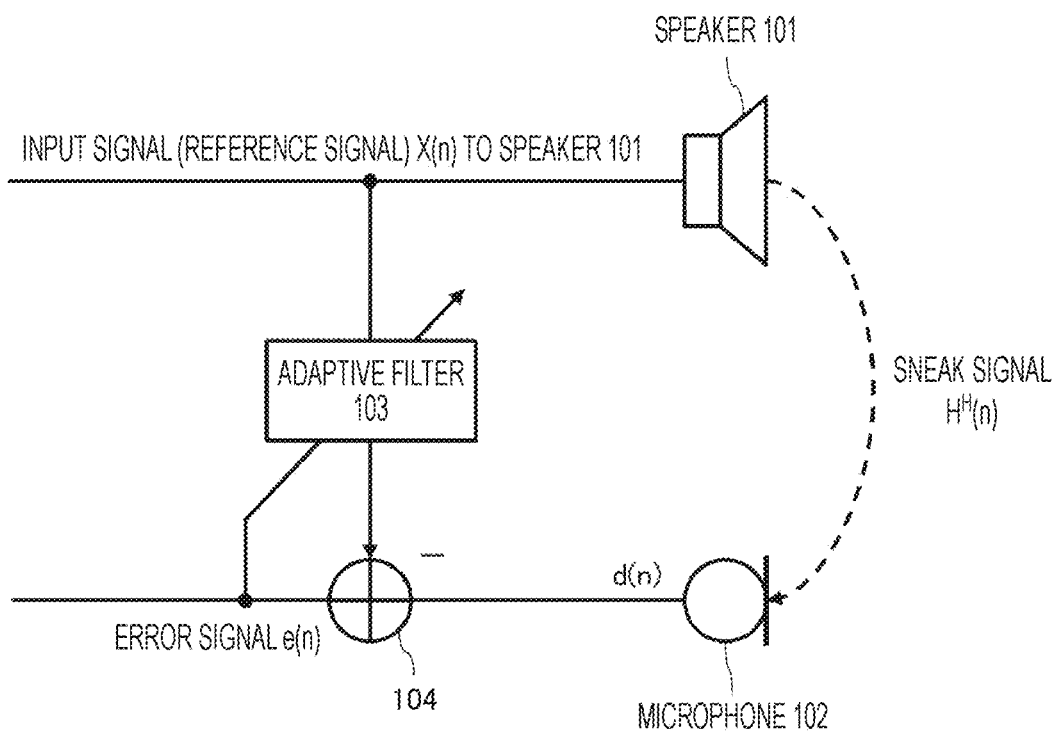
FIG. 1 is a diagram illustrating a functional configuration example of an echo canceller 100.

Hereinafter, an embodiment of the technology disclosed in this specification will be described in detail with reference to the drawings.

As for an echo canceller, attention should be paid also to a problem called system fluctuation in addition to double talk. A system fluctuation is, for example, a change in environment of space where sound such as sound of a user approaching a device, sound of a curtain closing, or sound of the device itself moving is transmitted. If the environment of the space suddenly changes from an adaptively calculated transmission characteristic, a mismatch of a transmission characteristic is caused, and an echo remains uncanceled.

In order to suppress deterioration of echo cancellation performance caused by a system fluctuation, an estimated transmission characteristic is desired to be brought close to a transmission characteristic of the changed space, as soon as possible. For this reason, when a system fluctuation occurs, it is necessary to increase learning speed of a transmission characteristic filter (or to keep a setting value such as a step size), contrary to a case of the double talk.

However, if a double-talk determination device is introduced, a function of slowing down convergence speed works when an amount of an echo remaining uncanceled is large, and therefore, following the environment does not progress quickly at a time of a system fluctuation. It can be said there is a trade-off relation between a double talk countermeasure and a system fluctuation countermeasure, and it is difficult to simultaneously solve these problems.

Therefore, in this specification, instead of the double-talk determination device (described above) that determines double talk on the basis of an echo remaining uncanceled, a determination device that determines double talk on the basis of another scale and an echo canceller to which the determination device based on the other scale is applied are proposed below.

The echo canceller proposed in this specification have an effect that the echo canceller reacts and increases learning speed of a transmission characteristic filter at a time of a system fluctuation, while slows down the learning speed of the transmission characteristic filter at a time of double talk and does not react at a time of a system fluctuation. Therefore, according to the echo canceller proposed in this specification, the trade-off relation between the double talk countermeasure and the system fluctuation countermeasure can be eliminated.

For the echo canceller proposed in this specification, by focusing on an amount of change in a transmission characteristic by which a filter is desired to be updated, a determination device reacting only to either double talk or a system fluctuation on the basis of difference between behavior at a time of double talk and behavior at a time of a system fluctuation is created. Then, by using such a determination device, it is possible to advance learning by slowing down a filter update at a time of double talk, and at fast filter update speed as set at a time of a system fluctuation.

Echo cancellation technology has been widely applied to videophones and the like. In a case where a communication partner is a human, communication is possible even if audio reproduced by the device itself sneaks in. On the other hand, in recent years, an audio conversation agent equipped with a speaker and a microphone have begun to spread. For example, it has become necessary to input a user utterance, which is input to a microphone, into an audio recognition engine connected to a network, and to convert the user utterance to text with a low delay. There has been an increasingly apparent problem that, a transmission characteristic of space changes only by a user approaching a device, and if the device itself emits audio while the user approaching the device, an echo remains uncanceled, and the audio is misidentified as a user utterance and input into an audio recognition engine, causing false operation. The echo canceller proposed in this specification can update a transmission characteristic filter with a low delay by appropriately corresponding to each of double talk and at a time of a system fluctuation, and can be suitably applied to an audio conversation agent.

FIG. 1 is a diagram schematically illustrating a functional configuration example of an echo canceller 100. In the figure, when a reference signal x(n) is input, a speaker 101 reproduces the reference signal, that is, outputs audio. Meanwhile, an audio signal d(n) is input to a microphone 102. Note that n is the number of taps, that is, an argument representing a tap position of an adaptive filter 103 (note that, in the description below, a fixed length of the number of taps is set to L, and an index in the fixed length L is represented by l (lowercase l)). Therefore, a range of l is 1≤l≤N. Furthermore, because selection of L is made from the latest index n to the past L, the index is a value up to (n−L+1)). In the following, n is also used to mean an index of a sample time.

Here, an input signal d(n) to the microphone 102 includes a sneak signal $H^H x(n)$, that is, an echo signal, from the speaker 101. Here, H is an actual transmission characteristic and is an actual transmission characteristic vector including, as a component, a transmission characteristic h(l) by the number of taps (specifically, $H=[h(1), h(2), \ldots, h(L)]^T$). The sneak signal $H^H(n)$ includes a reflection signal from environment, in addition to a direct wave x(n) that directly reaches from the speaker 101. The reflection signal is a vector in which a reflection signal from a nearby object and a reflection signal from a distant object are mixed. Usually, power of the reflection signal from the nearby object is large, and power of the reflection signal from the distant object is small.

The adaptive filter 103 adaptively changes an own filter characteristic so that an own output signal becomes close to a target signal. Specifically, the adaptive filter 103 outputs a pseudo echo signal obtained by multiplying the reference signal X(n) input to the speaker 101 by an estimated transmission characteristic W(n). Here, X(n) is a reference signal vector including, as a component, a reference signal x(l) by the number of taps (refer to the following Formula (6)), and W(n) is an estimated transmission characteristic vector including, as a component, a transmission characteristic (l) by the number of taps (refer to the following Formula (7)). A subtraction device 104 calculates a difference between the input signal d(n) to the microphone 102 as a target signal and the pseudo echo signal $W(n)^H X(n)$ output from the adaptive filter 103, that is, calculates an error signal e(n) (refer to the following Formula (1)), and then feeds back the error signal to the adaptive filter 103.

[Mathematical Formula 1]

$$e(n)=d(n)-W(n)^H X(n) \quad (1)$$

Then, the adaptive filter 103 adjusts an own filter characteristic, that is, the estimated transmission characteristic W(n), so that power of the error signal e(n) is minimized.

When power of the error signal e(n) is minimized, a filter coefficient W(n) of the adaptive filter 103 represents an actual transmission characteristic H. If a difference e(n) between the target signal d(n) and the output signal $W(n)^H X(n)$ of the adaptive filter 103 is 0, a characteristic W(n) of the adaptive filter should be equal to the actual transmission characteristic H.

In the adaptive filter 103, a filter representing a transmission characteristic is estimated according to a predetermined estimation algorithm. For example, an estimation formula for a transmission characteristic (or a learning formula for a filter) that adopts normalized least mean square (normalized LMS (NLMS)), which is a normalized LMS method, is shown in the following Formula (2).

[Mathematical Formula 2]

$$W(n+1)=W(n)+\mu e(n)^* X(n) \quad (2)$$

Here, μ in the above Formula (2) is a constant for adjusting convergence speed or update speed, that is, a step size. If the step size μ is large, the convergence speed is fast, and it is easy to follow an environmental change (a system fluctuation or the like). However, if the step size μ is too large, divergence occurs easily. It is known in the art that it is preferable to set μ to a value between 0 and 2.

Note that, in addition to the above-described LMS and NLMS, a method such as affine projection algorithm (APA) or recursive least square (RLS) can be adopted for an echo canceller. Furthermore, a transmission characteristic W(n) can be estimated (learned) by using machine learning. Features of each method are summarized in Table 1 below.

TABLE 1

| Method | Feature | Amount of calculation |
|---|---|---|
| LMS | Error power minimization is adaptively calculated not by directly calculating an autocorrelation matrix, but by assuming stationarity. | 2N |
| NLMS | Normalization is performed with power in a case where power of a reference signal changes. There is a trade-off relation between following of a continuous change and stability due to first-order processing. | 3N |
| APA | Minimization is performed for all errors back to p pieces of the past data. This method matches NLMS when p = 1. An amount of computation increases with p. | $N + pN + O(p^3)$ |
| RLS | Convergence is fast because errors of all past observation data are minimized. An inverse matrix of an autocorrelation matrix is calculated sequentially. An increase in the number of taps has a large influence on an amount of calculation. | $2N^2$ |

Although performance is higher in the order of RLS, APA, NLMS, and LMS, the higher the performance is, the greater an amount of calculation is. Therefore, it can also be said that the NLMS, the LMS, or the like is appropriate to be used for a real-time application.

Figure 2:
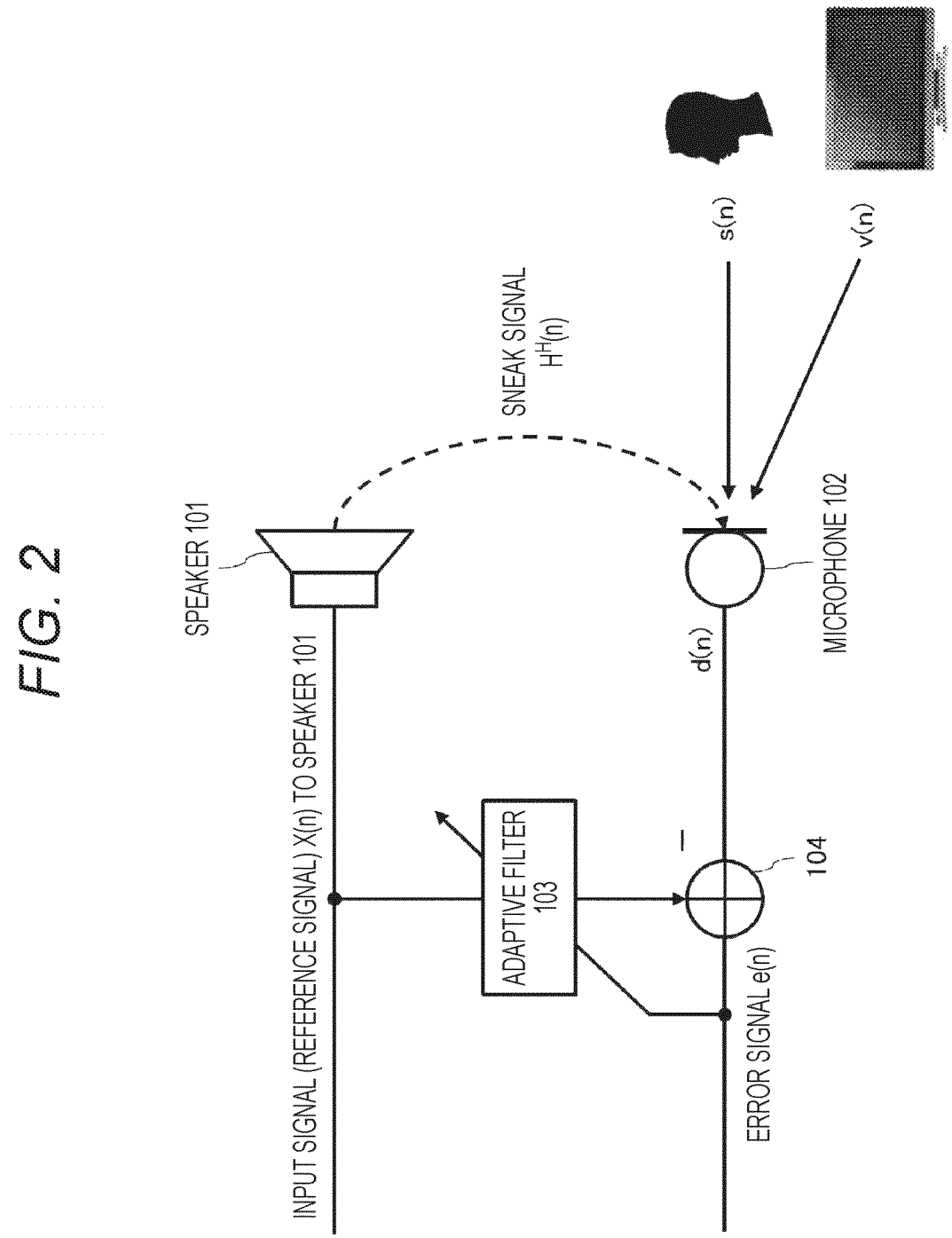
FIG. 2 is a diagram illustrating a state where the echo canceller 100 generates a double talk problem.

It is assumed that, in addition to an echo signal d(n), the microphone 102 also collects an utterance s(n) from a near-end speaking person, or unexpected noise v(n) such as output audio of a television or another AV device (refer to FIG. 2). If the adaptive filter 103 proceeds with estimation processing for a transmission characteristic in a state where the input signal d(n) of the microphone 102 includes the utterance from a near-end speaking person s(n), a true transmission characteristic cannot be learned well, and a double talk problem (described above) occurs. For example, an estimation algorithm such as NLMS or LMS, which performs learning of a transmission characteristic filter to minimize an error after echo processing, performs the learning so as to minimize the error. Thus, an incorrect transmission characteristic filter is estimated, and a phenomenon in which an echo remains uncanceled occurs. Note that, in this specification, description on suppression or removal of unexpected noise v(n) is not provided.

For this reason, when double talk occurs, it is preferable to reduce erroneous learning during the double talk by detecting the double talk and reducing learning speed of the adaptive filter 103. For example, the estimation formula for a transmission characteristic shown in the above Formula (2) is transformed into a formula for reducing the convergence speed on an occurrence of double talk, as shown in the following Formula (3).

[Mathematical Formula 3]

$$W(n+1)=W(n)+\mu_c\mu_{dt}e(n)^*X(n) \quad (3)$$

In the above Formula (3), the step size $\mu$ in the above Formula (2) is replaced with $\mu_c \cdot \mu_{dt}$. Here, $\mu_c$ is a fixed value, and $\mu_{dt}$ is a variable that changes according to an occurrence of double talk. Therefore, when double talk occurs, an adverse effect of the double talk, such as a mismatch of a transmission characteristic or deterioration of echo cancellation performance, can be suppressed by bringing a coefficient $\mu_{dt}$ close to 0 to reduce the step size $\mu$ in the estimation Formula (3) to reduce convergence speed.

For example, there is known a Wiener-type double-talk determination device that determines occurrence of double talk when a difference between the input signal d(n) to the microphone 102 and the output signal $W(n)^H X(n)$ of the adaptive filter 103, that is, the error signal e(n) is large (for example, refer to Patent Document 2).

The Wiener-type double-talk determination device can be expressed by the following Formula (4) for calculating a coefficient $\mu_{dt}$.

[Mathematical Formula 4]

$$\mu_{dt} = \frac{X(n)^H X(n)}{X(n)^H X(n) + c_{dt}e(n)^*e(n)} \quad (4)$$

In a denominator in the above Formula (4), e(n)*e(n) is a square of the error signal e(n). When the error signal e(n) increases, a value of the coefficient $\mu_{dt}$ becomes small. That is, $\mu_{dt}$ is a function that approaches 0 as the error signal e(n) increases. Therefore, by reducing the step size $\mu$, the learning speed of the adaptive filter 103 can be reduced, and erroneous learning during double talk can be reduced. Note that, in the denominator in the above Formula (4), $c_{dt}$ is a parameter (sensitivity weight) for adjusting reaction speed of the double-talk determination device.

If double talk or unexpected noise (described above) occurs, the error signal e(n) increases as the input signal d(n) of the microphone 102 increases rapidly. Therefore, the adaptive filter 103 can reduce erroneous learning during the double talk by adjusting the step size $\mu$ ($=\mu_c \cdot \mu_{dt}$) according to the above Formulas (3) and (4).

However, there is a factor that increases the error signal e(n) in addition to double talk and unexpected noise. Specifically, the error signal e(n) increases also in a situation where a surrounding transmission characteristic changes, that is, due to a system fluctuation. For example, if a true transmission characteristic changes from H to H', the transmission characteristic W(n) estimated by the adaptive filter 103 is greatly deviated from the true transmission characteristic H', thereby increasing the error signal e(n).

In the case of double talk or unexpected noise, the error signal e(n) increases as the input signal d(n) of the microphone 102 in the first term on the right-hand side of the above Formula (1) increases. On the other hand, when a system fluctuation occurs, the error signal e(n) increases as the estimated transmission characteristic W(n) in the second term on the right-hand side of the above Formula (1) deviates greatly from the true transmission characteristic. In any case of double talk, unexpected noise, and a system fluctuation, the error signal e(n) increases. It is difficult to distinguish double talk or unexpected noise from a system fluctuation by using a method for adjusting the step size $\mu$ on the basis of the error signal e(n), as in the above Formula (4).

In a case of double talk or unexpected noise, the learning speed should be reduced to suppress erroneous learning. On the other hand, in a case of a system fluctuation, the learning speed should be increased to quickly follow changed environment. If the adaptive filter 103 adjusts the learning speed according to the above Formulas (3) and (4), the learning speed is reduced for any of double talk, unexpected noise, and a system fluctuation. This is because e(n)*e(n) in the denominator in the above Formula (4) increases for any of double talk, unexpected noise, and a system fluctuation.

Figure 3:
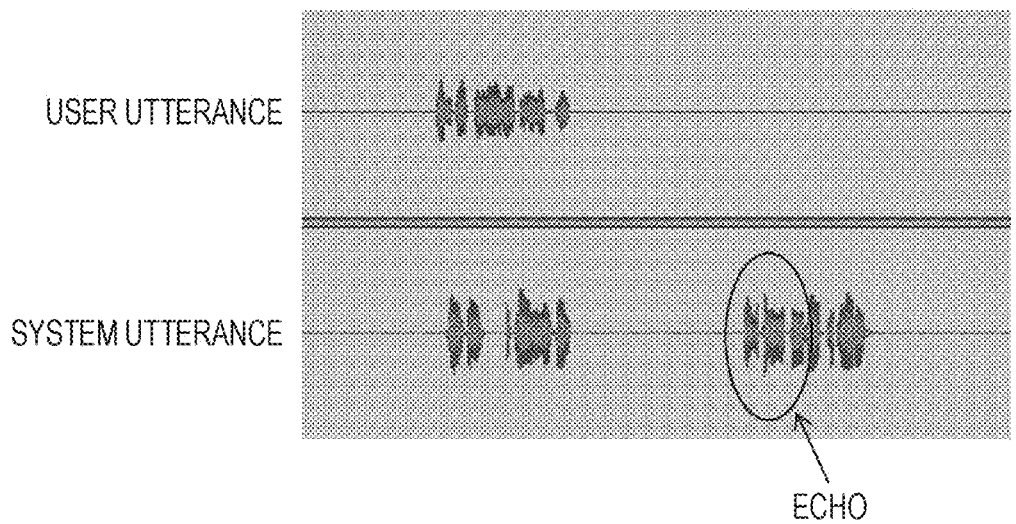
FIG. 3 is a diagram illustrating a state where an echo is generated by double talk.
Figure 4:
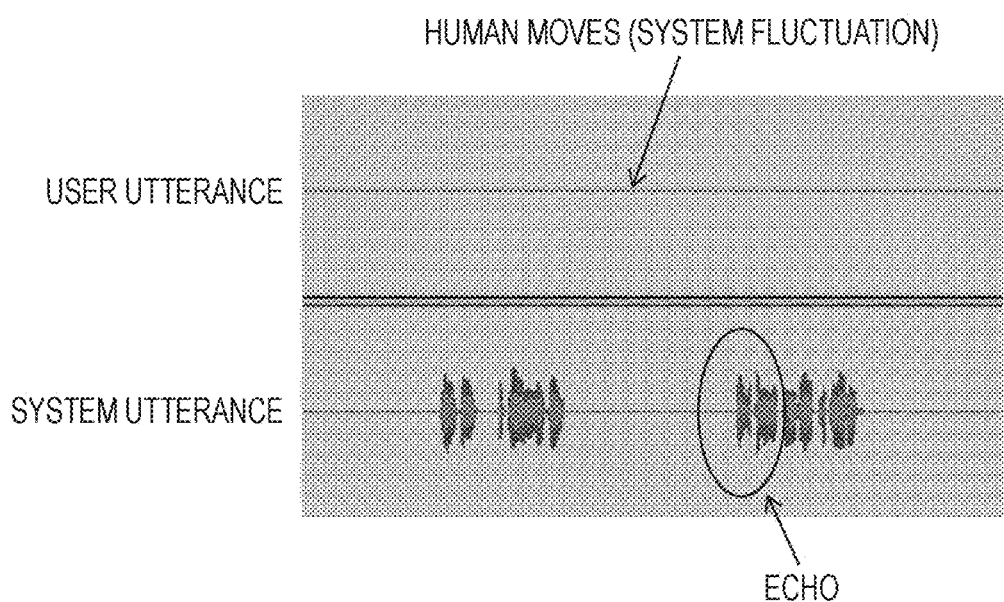
FIG. 4 is a diagram illustrating a state where an echo is generated by a system fluctuation.

FIG. 3 illustrates an example of a state where an echo is generated by double talk. Furthermore, FIG. 4 illustrates an example of a state where an echo is generated by a system fluctuation. Here, in each figure, a horizontal axis represents a time axis and a vertical axis represents power. In the example illustrated in FIG. 3, an echo is generated in an immediately subsequent system utterance, because a user utterance s(n) is learned. Meanwhile, in the example illustrated in FIG. 4, an echo is generated in an immediately subsequent system utterance, because learning speed is not sufficient for following the system fluctuation such as movement of a human.

When the error signal e(n) increases, the double-talk determination device expressed by the above Formula (4) reacts to any factors regardless of whether the factor is double talk or a system fluctuation. Although a method for increasing a reaction sensitivity adjustment parameter $c_{dt}$ to reduce false operation of the double-talk determination device is conceivable, there is a trade-off problem that learning does not progress at a time of a system fluctuation.

On an occurrence of double talk, an echo is generated due to a change in the transmission characteristic W(n) estimated by the adaptive filter 103. Therefore, on an occurrence of double talk, it is desired to stop learning of the adaptive filter 103 (or reduce learning speed). On the other hand, at a time of a system fluctuation, an echo is generated due to a change in the actual transmission characteristic H. Therefore, it is desired to increase the learning speed of the adaptive filter 103 at a time of a system fluctuation.

On an occurrence of double talk, it is desired to bring $\mu_{dt}$ close to 0. On an occurrence of double talk, by increasing the reaction sensitivity adjustment parameter $c_{dt}$, it is possible to bring $\mu_{dt}$ close to 0 with the above Formula (4), reduce the learning speed of the adaptive filter 103, and suppress the echo.

However, if the reaction sensitivity adjustment parameter $c_{dt}$ is increased, learning speed at a time of a system fluctuation is reduced. When a system fluctuation occurs (for example, when a human moves during audio synthesis (Text to Speech (TTS))), it is desired to keep $\mu_{dt}$ fix to 1 so that the learning speed is not reduced.

In a case of a determination device that reacts to magnitude of power of an error signal, only one of double talk and a system fluctuation can be solved, because both the double talk and a system fluctuation show a behavior in which the error signal increases.

In both double talk and a system fluctuation, an echo remaining uncanceled increases. For this reason, the double-talk determination device expressed by the above Formula (4) reacts to both double talk and a system fluctuation, and cannot adjust the step size $\mu$ suitable for each situation. If there is a phenomenon that appears only at a time of double talk, or a phenomenon that appears only at a time of a system fluctuation, it is desirable to create a double-talk determination device that detects the phenomenon.

Therefore, mechanism of erroneous learning by the adaptive filter 103 on an occurrence of double talk is focused.

As shown in the following Formula (5), in order to create a filter W(n+1) for next time, a filter update coefficient ΔW(n) is added to a filter W(n) for current time n. That is, an estimation filter W(n) is updated little by little by adding a slight amount of change ΔW(n) to an estimation filter W(n) that has already been estimated originally. Here, the filter update coefficient ΔW(n) differs depending on an estimation algorithm applied to perform learning of the filter representing a transmission characteristic.

[Mathematical Formula 5]

$$W(n+1)=W(n)+\mu\Delta W(n) \quad (5)$$

At the time n, the reference signal X(n) which is reproduced from the speaker 101 and reaches the microphone 102 is expressed as a vector including components the number of which corresponds to tap length L of the adaptive filter 103, as shown in the following Formula (6). Here, x(n) is a component of a direct wave that directly reaches the microphone 102 from the speaker 101. Other components x(n−1), x(n−2), . . . , x(n−L+1) are components of a reflection signal reflected from a wall or the like. A reflection signal having a larger delay time is a reflection signal from a wall farther away.

[Mathematical Formula 6]

$$X(n)=[x(n),x(n-1),\ldots,x(n-L+1)]^H \quad (6)$$

Furthermore, an estimation filter W representing a transmission characteristic includes coefficients to be multiplied by each of components x(n), x(n−1), x(n−2), . . . , x(n−L+1) of the reference signal, as shown in the following Formula (7). Here, w(1) is a coefficient to be multiplied by a direct signal x(n), and other coefficients w(2), w(3), . . . , w(L) are coefficients to be multiplied by reflection signals x(n−1), x(n−2), . . . , x(n−L+1), respectively.

[Mathematical Formula 7]

$$W=[w(1),w(2),\ldots,w(L)]^H \quad (7)$$

Then, at the time n, y(n), which is a signal after the transmission characteristic is estimated (that is, a pseudo echo signal output from the adaptive filter 103) is expressed as in the following Formula (8).

[Mathematical Formula 8]

$$y(n) = \sum_{l=1}^{L} w(l) \times (x-l) = W^H x(n) \quad (8)$$

The estimation filter W itself expressed by the above Formula (7) represents a transmission characteristic in real space. Of the values of W, a value in the latter half close to w(L) corresponds to a component to be multiplied by a reflection signal from a wall farther away. A reflection signal from a wall farther away becomes a reference signal component that reaches the microphone 102 with much smaller power than power of a direct wave (basically, power of an audio signal is attenuated by the square of distance). Therefore, the coefficient in the latter half closer to w(L) has a smaller value.

Double talk is an audio signal emitted from sound source separated from the microphone 102, apart from the speaker 101, and, in other words, a tap that should have only a small reflection component from a wall is input to the microphone 102 as an audio signal with strong power. For this reason, the adaptive filter 103 tries to change a coefficient largely (that is, to correct the coefficient so that a form of the filter becomes large) with respect to a tap input with loud sound, which is actually a reflection from a far wall.

Therefore, at a time of double talk, a phenomenon of a great deviation from a transmission characteristic power of a reflection wave after a direct wave, which is originally supposed to attenuate, is caught, and expressed by a formula for adjusting the step size μ to delay the convergence speed at that time. Meanwhile, at a time of a system fluctuation, because power of the speaker 101 originally reproduced does not change, change in power of the filter is minute, although there is a phase change due to a change in an estimated reflection path of the filter.

On an occurrence of double talk, the transmission characteristic W(n) estimated by the adaptive filter 103 changes. On the other hand, at a time of a system fluctuation, the estimated transmission characteristic W(n) does not change very much, and the actual transmission characteristic H changes.

Therefore, by focusing on the difference in the transmission characteristic change between double talk and a system fluctuation, fluctuation of a square norm of a filter update coefficient ΔW(n) will be compared. A filter update coefficient ΔW(n) is calculated according the following Formula (9), and a square norm of the transmission characteristic W(n) and the square norm of the filter update coefficient ΔW(n) are calculated according to the following Formulas (10) and (11), respectively. Here, l is a tap ID, and k is a frequency bin (a discrete value corresponding to a frequency resolution (bin width)) (the same applies hereinafter). The tap ID means both an argument representing a tap position of the adaptive filter 103 and an index of sample time.

[Mathematical Formula 9]

$$\Delta W(n) = \frac{e(n)^* X(n)}{X(n)^H X(n) + \beta} \quad (9)$$

[Mathematical Formula 10]

$$\|\overline{w(l)}\|^2 = \frac{1}{K}\sum_{l=1}^{K} \|w(k,l)\|^2 \quad (10)$$

[Mathematical Formula 11]

$$\|\overline{\Delta w(l)}\|^2 = \frac{1}{K}\sum_{l=1}^{K} \|\Delta w(k,l)\|^2 \quad (11)$$

Figure 5:
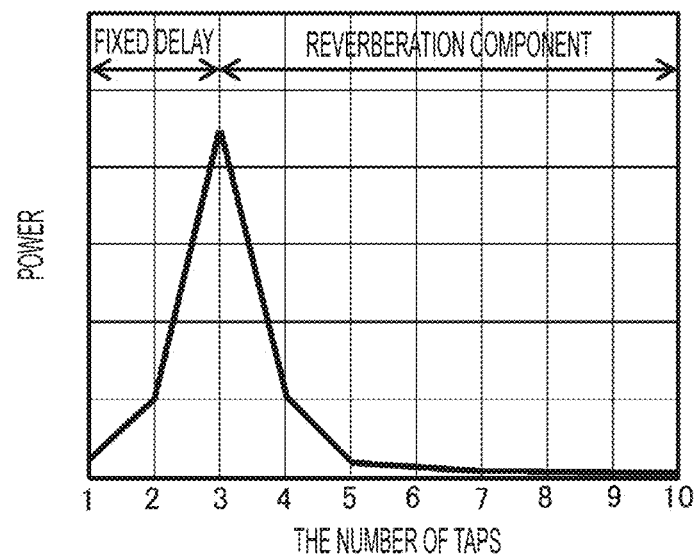
FIG. 5 is a diagram illustrating an example of a change in a square norm of a transmission characteristic W(n) for each tap.

FIG. 5 illustrates an example of a change in the square norm of the transmission characteristic W(n) for each tap. Here, a horizontal axis represents a tap, and a vertical axis represents a square norm of the filter W. Although the example illustrated in the figure assumes a case where double talk or a system fluctuation does not occur, the square norm of the transmission characteristic W(n) peaks at a tap position corresponding to a fixed delay, and then slowly attenuates due to a reverberation component by a reflection wave from a wall, or the like.

Figure 6:
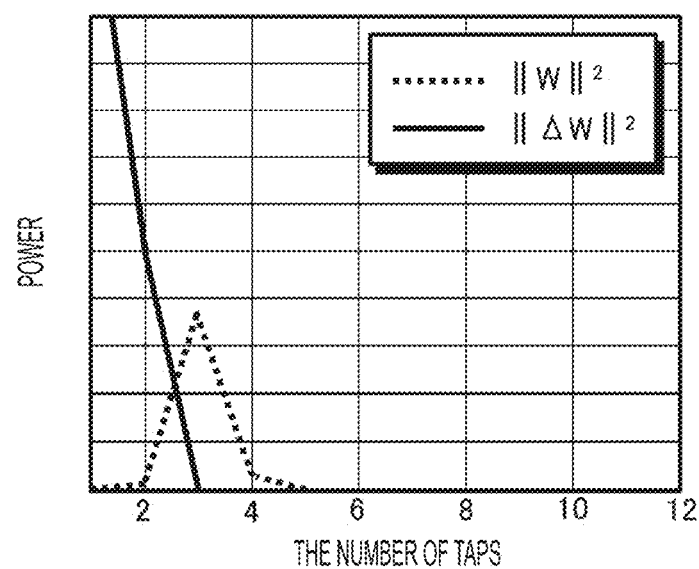
FIG. 6 is a diagram illustrating an example of a change in a square norm of a filter update coefficient ΔW(n) of a transmission characteristic for each tap on an occurrence of double talk.
Figure 7:
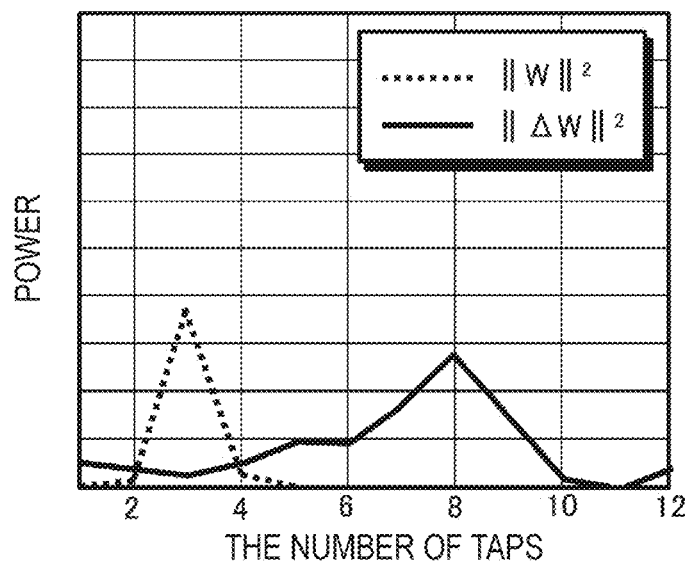
FIG. 7 is a diagram illustrating an example of a change in a square norm of a filter update coefficient ΔW(n) of a transmission characteristic for each tap on an occurrence of double talk.
Figure 8:
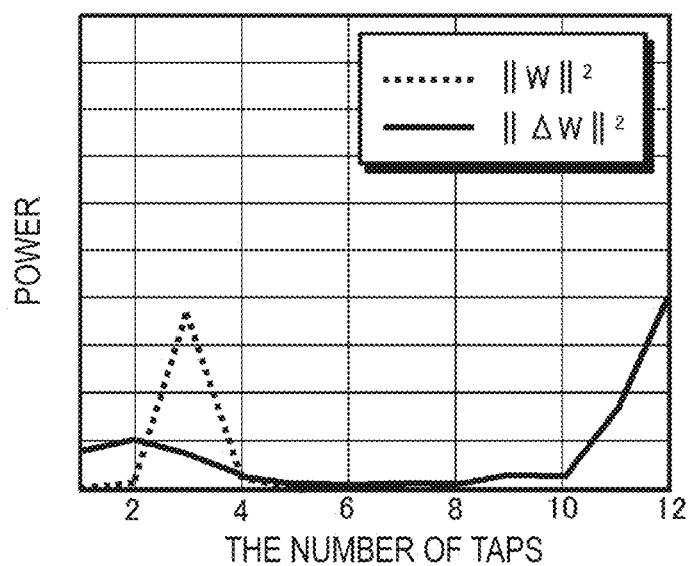
FIG. 8 is a diagram illustrating an example of a change in a square norm of a filter update coefficient ΔW(n) of a transmission characteristic for each tap on an occurrence of double talk.

FIGS. 6 to 8 illustrate examples of a change in the square norm of the filter update coefficient ΔW(n) of the transmission characteristic for each tap on an occurrence of double talk. Here, a horizontal axis represents a tap (here, 16 milliseconds per tap), and a vertical axis represents the square norm of the filter update coefficient ΔW. The square norm of the filter update coefficient ΔW is drawn with a solid line, and for reference, the square norm of the filter W is drawn with a dotted line.

As can be seen from FIGS. 6 to 8, on an occurrence of double talk, the square norm of the filter update coefficient ΔW changes sharply and exceeds a maximum value of the square norm of the filter W. For example, with reference to FIG. 8, with a delay of 200 milliseconds, power greater than power of the direct wave is included in the filter update coefficient ΔW. This is considered to be due to appearance of learning behavior uncorrelated with a feature of space (transmission characteristic h), because, on an occurrence of double talk, if the error signal e(n) increases, erroneous learning of a transmission characteristic filter W(n) is performed.

Figure 9:
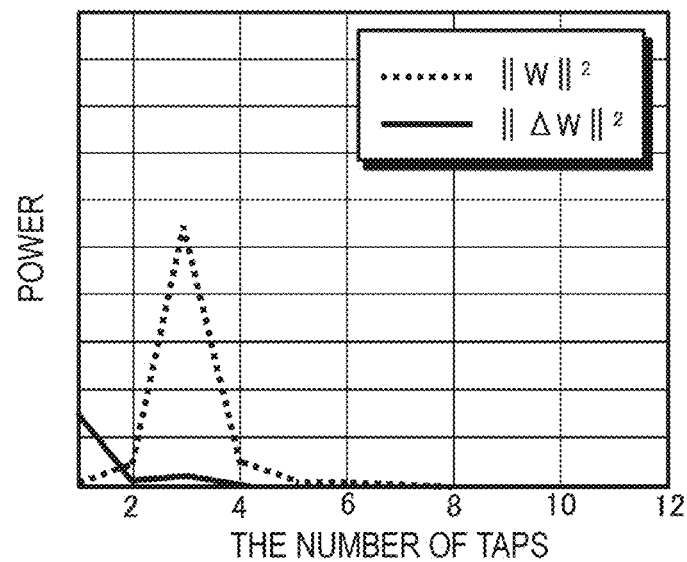
FIG. 9 is a diagram illustrating an example of a change in a square norm of a filter update coefficient ΔW(n) of a transmission characteristic for each tap at a time of a system fluctuation.
Figure 10:
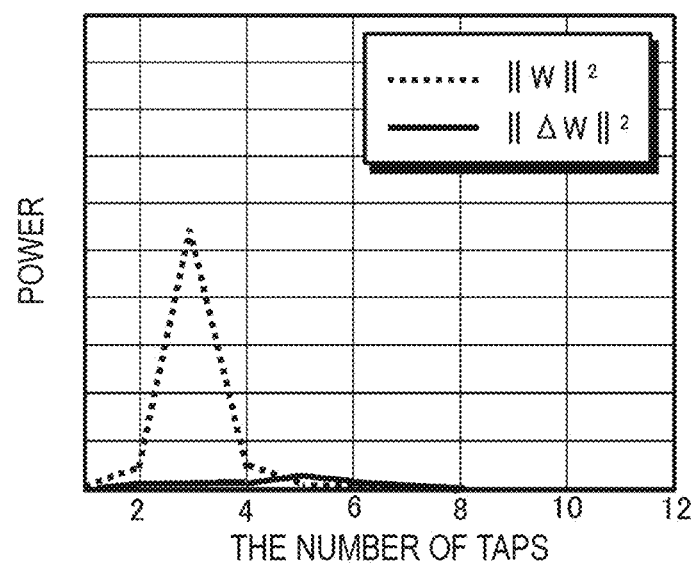
FIG. 10 is a diagram illustrating an example of a change in a square norm of a filter update coefficient ΔW(n) of a transmission characteristic for each tap at a time of a system fluctuation.
Figure 11:
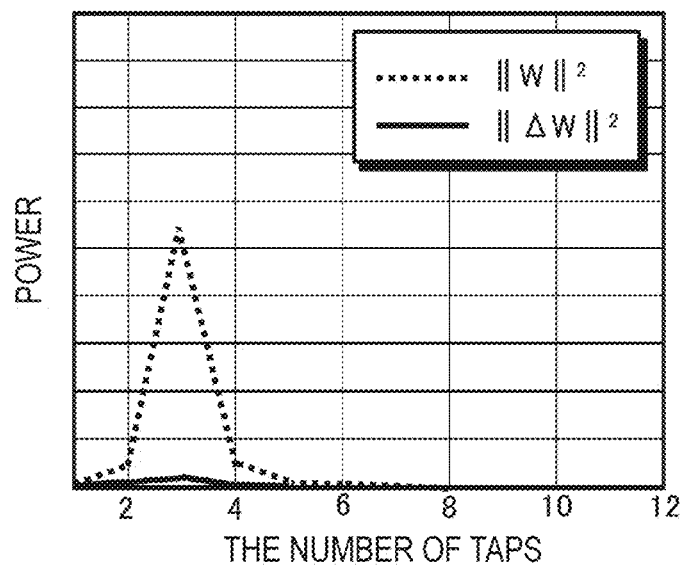
FIG. 11 is a diagram illustrating an example of a change in a square norm of a filter update coefficient ΔW(n) of a transmission characteristic for each tap at a time of a system fluctuation.

Furthermore, FIGS. 9 to 11 illustrate examples of a change in the square norm of the filter update coefficient ΔW(n) of the transmission characteristic for each tap at a time of a system fluctuation. Here, a horizontal axis represents a tap (here, 16 milliseconds per tap), and a vertical axis represents the square norm of the filter update coefficient ΔW. The square norm of the filter update coefficient ΔW is drawn with a solid line, and for reference, the square norm of the filter W is drawn with a dotted line.

As can be seen from FIGS. 9 to 11, at a time of a system fluctuation, the square norm of the filter update coefficient ΔW changes gently at low power. At a time of a system fluctuation, although the error signal e(n) increases, proper learning of the transmission characteristic filter W(n) is performed. Furthermore, the power of the reproduction signal x(n) from the speaker 101 is the same. For this reason, it is considered that the square norm of the filter update coefficient ΔW shows a behavior in which only a waveform slightly changes while the power of the transmission characteristic filter W(n) is maintained.

From FIGS. 6 to 8, FIGS. 9 to 11, and the like, it is possible to obtain prior knowledge related to a filter form that there is a great deviation from a transmission characteristic power of a reflection wave after a direct wave, which is originally supposed to attenuate at a time of double talk, while change in the power of the filter is minute at a time of a system fluctuation.

As can be seen also with reference to FIG. 5, in a situation where double talk does not occur, a reverberation component by a reflection wave from the wall, or the like attenuates slowly. Therefore, it can be assumed that the square norm of the filter update coefficient ΔW does not become comparable to a maximum value of the square norm of the filter W. On the other hand, in the example on an occurrence of double talk illustrated in FIG. 8, as illustrated again in FIG. 12, after the number of taps after a fixed delay, that is, time after the fixed delay has elapsed, the square norm of the filter update coefficient ΔW becomes comparable to or exceeds the maximum value of the square norm of the filter W, as indicated by reference number 1201. It is clear that such movement by the square norm of the filter update coefficient ΔW is not due to a reverberation component, and it is considered that such movement is due to appearance of learning behavior uncorrelated with a feature of space (transmission characteristic H).

Therefore, in the technology disclosed in this specification, a variable $\mu_{dt}'$ that changes according to an occurrence of double talk is newly defined as illustrated in the following Formula (12), while focusing on forming a filter for each tap ID (in other words, according to elapse of time), and on having a different feature in double talk and in a system fluctuation (described above). Then, a final learning formula for a filter is as shown in the following Formula (13). Here, l is a tap ID, and k is a frequency bin (the same as the above).

[Mathematical Formula 12]

$$\mu_{dt}'(l) = \frac{\max(\|\overline{w(l)}\|^2)}{\max(\|\overline{\Delta w(l)}\|^2) + c_{dt}'\|\Delta w(l)\|^2} \quad (12)$$

[Mathematical Formula 13]

$$W(n+1) = W(n) + \mu_c \mu_{dt}' \Delta W(n) \quad (13)$$

Note that, in the above Formula (13), the filter update coefficient ΔW(n) is as shown in the above Formula (9). Furthermore, in the above Formula (12), the square norm of w(l) and the square norm of Δw(l) are as shown in the above Formulas (10) and (11), respectively. Note that $c_{dt}'$ is a parameter (sensitivity weight) for adjusting reaction speed of a double-talk determination device.

In the learning formula (13) for a filter, the step size μ for adjusting convergence speed is replaced with $\mu_c \cdot \mu_{dt}'$. Here, $\mu_c$ is a fixed value, and $\mu_{dt}'$ is a variable that reacts to double talk but does not react to a system fluctuation.

$\mu_{dt}'$ shown in the above Formula (12) uses a sum of a maximum value of the square norm of the filter W and the square norm of the filter update coefficient as a denominator, and uses a maximum value of the square norm of the filter W as a numerator. Therefore, when the square norm of the filter update coefficient becomes large, a value of the coefficient $\mu_{dt}'$ becomes small. That is, $\mu_{dt}'$ is a function that approaches 0 as the square norm of the filter update coefficient increases.

Figure 12:
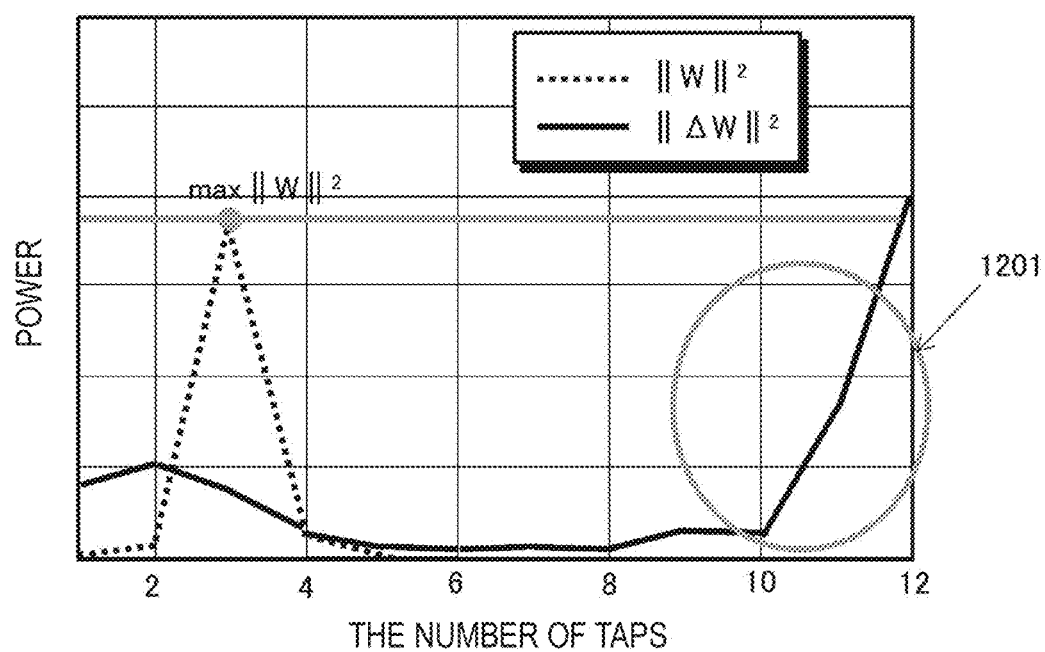
FIG. 12 is a diagram illustrating an example of a change in a square norm of a filter update coefficient ΔW(n) of a transmission characteristic for each tap on an occurrence of double talk.

As described in FIG. 12 (or FIG. 8), assuming that the square norm of the filter update coefficient ΔW becomes comparable to or exceeds a maximum value of the square norm of the filter W, on an occurrence of double talk, it is possible to reduce erroneous learning during the double talk by reducing the learning speed of the adaptive filter 103 by applying a learning formula that represents a step size with $\mu_{dt}'$.

Furthermore, as described in FIGS. 9 to 11, at a time of a system fluctuation, the square norm of the filter update coefficient ΔW moves slowly, and $\mu_{dt}'$ is kept fixed to 1. Therefore, by applying a learning formula that represents a step size with $\mu_{dt}'$, learning speed will not slow down. That is, with the learning formulas expressed by the above Formulas (12) and (13), it is possible to correspond to a system fluctuation.

The above Formulas (12) and (13) will be described in more detail.

For the filter update coefficient ΔW, past data corresponding to tap length of a reference signal x is multiplied by an echo component d. In a case where reproduction audio source of a speaker, which serves as the reference signal x, is Text To Speech (TTS) or the like, the reference signal x becomes sparse (sparse) in a time direction when audio is Fourier-transformed and viewed for each frequency. For this reason, in a reference signal vector X including reference signals corresponding to the tap length, there are strong components around some taps, however, there is no signal in the remaining tap sections, resulting in 0.

According to the above Formula (12), what is necessary for determination of double talk is a large variation in the filter update coefficient ΔW. However, in a case of TTS, no reaction is seen with some taps, and therefore accuracy of the double-talk determination device falls if some averaging is performed. Therefore, in order to purely determine the change in the tap that greatly reacts due to double talk, the double-talk determination device expressed by the above Formula (12) is used for each tap. Then, accordingly, fine adjustment of the step size μ is performed for each tap.

Furthermore, the above Formula (12) is obtained by expressing a double-talk determination device with a formula, and includes power components of the filter W and the filter update coefficient ΔW. Here, maximum values of the power components of the filter W and the filter update coefficient ΔW vary depending on magnitude of the input signal x, distance between the speaker and the microphone, sensitivity of the microphone, volume of a user utterance, or the like, and cannot be determined uniquely.

In a case where (a) and (b) below are satisfied, it can be said that $\mu_{dt}'$ is easy to use as a double-talk determination device.

(a) In a learning formula for a filter, $\mu_{dt}'$ is, as a step size μ representing convergence speed (or update speed), multiplied by a filter update coefficient ΔW.

(b) $\mu_{dt}'$ is between 0 and 1 and approaches 0 only on an occurrence of double talk.

For that purpose, it is necessary to incorporate a value that changes in a specific state with respect to a certain reference value. The calculation formula for $\mu_{dt}'$ shown in the above Formula (12) is a formula that reacts with the power of the filter update coefficient ΔW as a specific state with reference to a maximum value among all the taps of the estimated power of the filter W. That is, the above Formula (12) uses a maximum value reference of the estimated power of the filter W as the numerator, and a sum of the maximum value reference and the power of the filter update coefficient ΔW multiplied by a constant $c_{dt}'$ that sets reaction sensitivity as the denominator. Therefore, when the power change of the filter update coefficient ΔW is 0, that is, when an echo disappears correctly, the denominator and the numerator are equal and $\mu_{dt}'$ becomes 1. Meanwhile, when double talk occurs, the power of the filter update coefficient ΔW increases, so that a value of $\mu_{dt}'$ approaches 0, and finally the filter update can be delayed.

In the description so far, the purpose is to detect a section where double talk occurs. Therefore, as shown in the above Formula (12), the frequency band to be processed is integrated to calculate $\mu_{dt}'$. However, because an S/N ratio differs for each frequency, there is a problem that design of sensitivity weight $c_{dt}'$ becomes unreasonable. Therefore, as shown in the following Formula (14), the square norm of the filter update coefficient ΔW is calculated independently for each frequency, and a variable $\mu_{dt}''$ for each frequency that changes according to an occurrence of double talk is newly defined. In this case, as well as the filter update coefficient ΔW, as shown in the following Formula (15), a maximum value of the square norm of the filter is also a maximum value calculated independently for each frequency. Here, l is a tap ID, and k is a frequency bin (the same as the above).

[Mathematical Formula 14]

$$\mu_{dt}''(k, l) = \frac{\|w_{max}(k)\|^2}{\|w_{max}(k)\|^2 + c_{dt}'' \times \|\Delta w(k, l)\|^2} \quad (14)$$

[Mathematical Formula 15]

$$\|w_{max}(k)\|^2 = \max_{l}(\|w_{max}(k, l)\|^2) \quad (15)$$

Furthermore, a final learning formula for a filter in this case is as shown in the following Formula (16). Here, in the Formula (16), $\mu_{dt}''$ is a vector of the number of frames corresponding to tap length.

[Mathematical Formula 16]

$$W(n+1)=W(n)+\mu_c\mu_{dt}''\Delta W(n) \quad (16)$$

It can also be said that $\mu_{dt}''$ expressed by the above Formula (14) is obtained by expressing a double-talk determination device by the formula.

The double-talk determination device expressed by the above Formula (12) or (14) can also be said to be a ratio of the power of the filter update coefficient ΔW to maximum power of the filter W. On the other hand, a sigmoid-type double-talk determination device $\mu_{dt}^{(3)}$ as shown in the following Formula (17) can be newly defined. Note that $P_e(k, l)$ in the Formula (17) is as shown in the following Formula (18). Here, l is a tap ID, and k is a frequency bin (the same as the above). $P_e(k, l)$ is a difference between a maximum value of the square norm of the filter and each decibel value of the square norm of the filter update coefficient for the frequency bin k and a tap l.

[Mathematical Formula 17]

$$\mu_{dt}^{(3)} = \frac{1}{1 + e^{-a[P_e(u)-c_{dt}^{(3)}]}} \quad (17)$$

[Mathematical Formula 18]

$$P_e(k, l) = 10\ln\{\|w_{max}(k)\|^2\} - 10\ln\{\|\Delta w(k, l)\|^2\} \quad (18)$$

Furthermore, a final learning formula for a filter in this case is as shown in the following Formula (19). Here, in the Formula (19), $\mu_{dt}^{(3)}$ is a vector of the number of frames corresponding to tap length.

[Mathematical Formula 19]

$$w(n+1)=w(n)+\mu_c\mu_{dt}^{(3)}\Delta w(n) \quad (19)$$

As already described, on an occurrence of double talk, it is desired to bring $\mu_{dt}^{(3)}$ close to 0, while at a time of a system fluctuation, it is desired to keep $\mu_{dt}^{(3)}$ fix to 1. The sigmoid type has a feature in which change of $\mu_{dt}^{(3)}$ from 0 to 1 can easily be bi-polarized to be closer to either 0 or 1. Specifically, in the above Formula (17) expressed by a sigmoid function, bi-polarization proceeds by setting a gain a to a larger value.

Note that, if a ratio of the power of the filter update coefficient ΔW to the maximum power of the filter W can be suitably expressed, other double-talk determination devices can be configured by using various functions other than a sigmoid function. A function with which bi-polarization is easy is more preferable.

Figure 13:
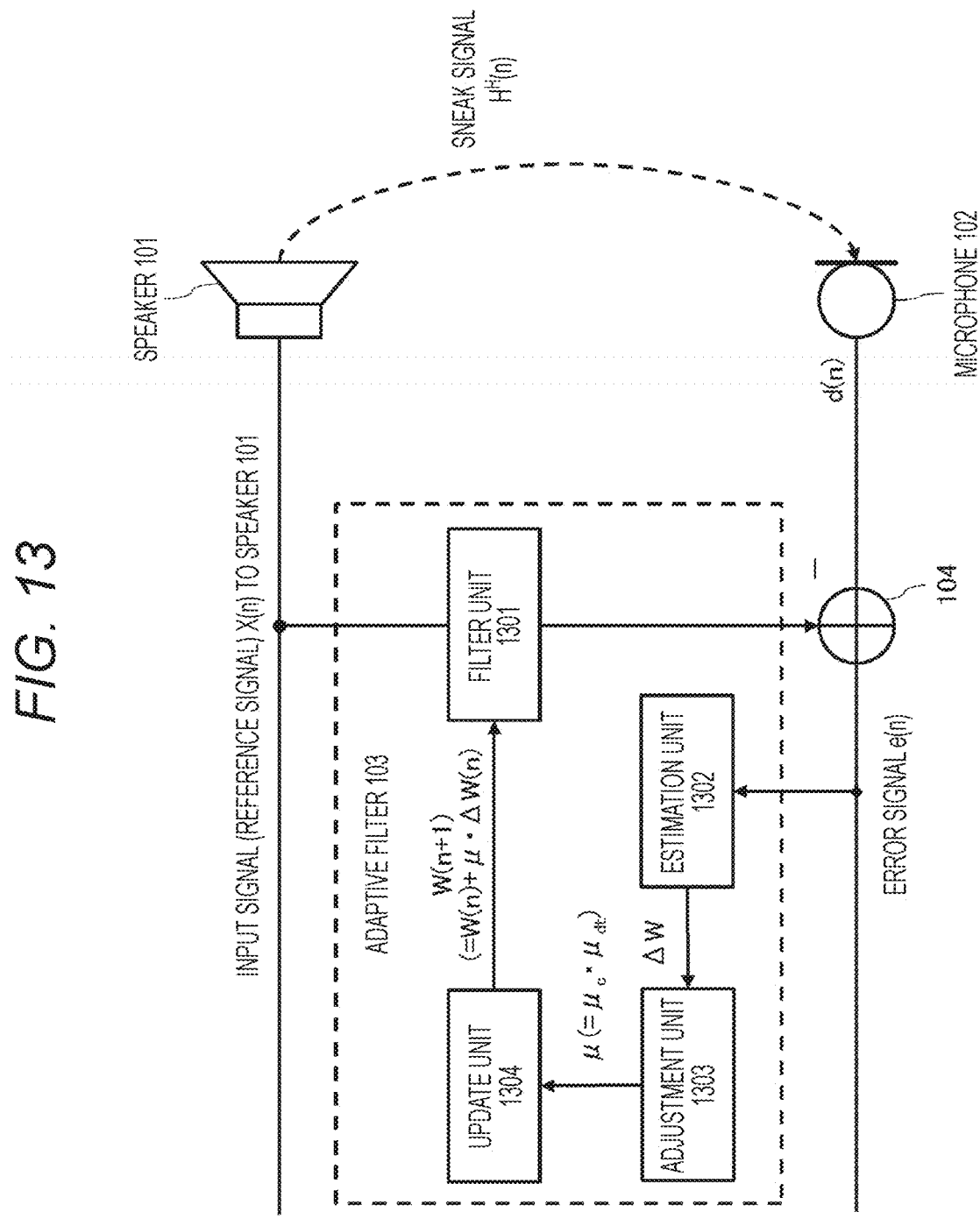
FIG. 13 is a diagram illustrating a specific configuration of an adaptive filter 103.

Although FIG. 1 schematically illustrates a functional configuration example of the echo canceller 100, FIG. 13 illustrates a specific configuration of the adaptive filter 103. The adaptive filter 103 illustrated in FIG. 13 includes a filter unit 1301, an estimation unit 1302, an adjustment unit 1303, and an update unit 1304.

The filter unit 1301 multiplies a reference signal input to the speaker 101 by an estimation filter representing a transmission characteristic, and outputs a pseudo echo signal.

The estimation unit 1302 estimates a filter representing a transmission characteristic from the speaker where the reference signal is output to the microphone in which the reference signal sneaks according to a predetermined estimation algorithm. Examples of the estimation algorithm include LMS, NLMS, APA, and RLS, as described above. For example, in a case where the NLMS algorithm is applied, the estimation unit 1302 estimates a filter to minimize an error between an input signal of the microphone 102 and the pseudo echo signal calculated by the filter unit 1301, and obtains a filter update coefficient.

On the basis of the filter update coefficient estimated by the estimation unit 1302, the adjustment unit 1303 determines a step size $\mu$ for determining convergence speed with a learning formula for a filter. In this embodiment, the step size $\mu$ is represented by a variable that reacts to a fixed value $\mu_c$ and double talk but does not react to a system fluctuation (that is, $\mu=\mu_c \cdot \mu_{dt}'$), and $\mu_{dt}'$ is calculated on the basis of a ratio of power of the filter update coefficient to maximum power of the filter.

Specifically, according to the above Formula (12), the adjustment unit 1303 calculates the variable $\mu_{dt}'$ by using a maximum value reference of power of the filter as the numerator, and a sum of the maximum value reference and power of the filter update coefficient $\Delta W$ multiplied by a constant that sets reaction sensitivity as the denominator. Here, the adjustment unit 1303 calculates the variable $\mu_{dt}'$ for each tap of the filter. The adjustment unit 1303 can also be referred to as a double-talk determination device expressed by the calculation formula for the variable $\mu_{dt}'$.

Alternatively, according to the above Formula (14), the adjustment unit 1303 may calculate the variable $\mu_{dt}'$ for each frequency by using the filter and the filter update coefficient, which are calculated independently for each frequency.

Alternatively, according to the above Formula (17), the adjustment unit 1303 may calculate the variable $\mu_{dt}'$ for each frequency by using a sigmoid function according to a ratio of the power of the filter update coefficient to the maximum power of the filter.

Then, the update unit 1304 multiplies the filter update coefficient by the step size $\mu$ ($=\mu_c \cdot \mu_{dt}'$) expressed by the calculated variable $\mu_{dt}'$ to create an estimation filter for the next time, and the estimation filter is set to the filter unit 1301.

The double-talk determination device proposed in this specification is expressed by, for example, the above Formula (12), (14), or (17), and is configured to monitor the power of the filter update coefficient $\Delta W$ for each tap with respect to power of the estimated filter W for each tap, and to determine that a signal component different from a signal component of the speaker 101 of the device itself, that is, double talk, is mixed, when a filter update coefficient $\Delta W$, which is extremely large power from the estimated w, appears.

That is, the double-talk determination device proposed in this specification focuses on the filter update coefficient $\Delta W$ that updates the estimation filter W representing a transmission characteristic of space, and determines double talk by using change from the form of a square norm of the estimation filter. The double-talk determination device proposed in this specification uses the fact that changing way of the filter update coefficient $\Delta W$ shows a behavior different in double talk or in a system fluctuation.

Therefore, the double-talk determination device proposed in this specification has a feature to be able to react only to double-talk by capturing behavior of $\Delta W$ that is not expected in a usual filter update on an occurrence of double talk, and is less likely to perform false operation at a time of a system fluctuation. Because the double-talk determination device proposed in this specification reacts instantaneously when the filter form is disturbed, it can be said that the double-talk determination device is strong, for example, against TTS that suddenly produces sound from silence. Furthermore, in the double-talk determination device proposed in this specification, a threshold setting for determining double talk is simple because a ratio is taken from a maximum value of the square norm of the filter without considering reproduction volume, sound source, frequency, and positions of the speaker 101 and the microphone 102.

Furthermore, by using the above Formula (12), (14), or (17), the step size $\mu$ that determines convergence speed of the learning formula for a filter can be normalized to an amount that changes between 0 and 1 according to an amount of change of the filter update coefficient $\Delta W$, with reference to a maximum value of power calculated for each tap of the filter W. That is, the step size $\mu$ for determining the convergence speed of the learning formula for a filter can be appropriately and automatically adjusted.

Note that, although the above Formulas (12), (14), and (17) are all calculation formulas for adjusting the step size $\mu$ for each tap, all the taps may be averaged to obtain one step size $\mu$. The calculation formula for averaging all taps is shown below. The following Formula (20) is a modification of the above Formula (12).

[Mathematical Formula 20]

$$\mu_{dt}' = \frac{\max(\|\overline{w_{max}(l)}\|^2)}{\max(\|\overline{w_{max}(l)}\|^2) + \frac{1}{L}\sum_{l=0}^{L}(\|\overline{w_{max}(l)}\|^2)} \quad (20)$$

Therefore, an echo canceller to which the technology disclosed in this specification is applied can appropriately and automatically adjust the step size $\mu$ that determines convergence speed of the adaptive filter 103. Furthermore, the echo canceller to which the technology disclosed in this specification is applied can realize appropriate filter learning by delaying convergence of the filter W on an occurrence of double talk, while by maintaining the convergence speed as is and advancing learning of the filter W at a time of a system fluctuation. According to the technology disclosed in this specification, it is possible to implement improvement of the convergence speed of the filter with a small amount of calculation.

INDUSTRIAL APPLICABILITY

In the above, the technology disclosed in this specification has been described in detail with reference to the specific embodiment. However, it is obvious that those skilled in the art can make modifications and substitutions of the embodiment without departing from the scope of the technology disclosed in this specification.

The technology disclosed in this specification can be applied not only to a field where echo cancellation technology has already been widely applied, such as a videophone, but also to an audio conversation agent or the like equipped with a speaker and a microphone. In a case where the technology disclosed in this specification is applied to an audio conversation agent, it is possible to update a transmission characteristic filter adaptively with a low delay in each case of double talk and at a time of a system fluctuation, causing the audio utterance agent to be less likely to perform false operation even if audio is input into an audio recognition engine.

The technology disclosed in this specification can be implemented by using hardware such as a digital signal processor, and can also be implemented by using software. In the latter case, echo cancellation appropriately corresponding to each of double talk and at a time of a system fluctuation can be realized by applying the technology disclosed in this specification to various information devices equipped with a speaker and a microphone.

In short, the technology disclosed in this specification has been described in the form of exemplification, and the description content of this specification should not be restrictively interpreted. In order to determine the gist of the technology disclosed in this specification, the claims should be taken into consideration.

Note that the technology disclosed in this specification can also be configured as below.

(1) An audio processing device including:
an estimation unit that estimates a filter representing a transmission characteristic from a speaker where a reference signal is output to a microphone in which the reference signal sneaks;
an adjustment unit that adjusts a step size on the basis of a filter update coefficient estimated by the estimation unit; and
an update unit that updates the filter according to the filter update coefficient and the step size.

(2) The audio processing device according to (1) described above,
in which the adjustment unit adjusts the step size on the basis of a ratio of power of the filter update coefficient to maximum power of the filter.

(3) The audio processing device according to (1) or (2) described above,
in which the adjustment unit brings the step size close to 0 as a ratio of power of the filter update coefficient to maximum power of the filter increases, and brings the step size close to 1 as the ratio of the power of the filter update coefficient to the maximum power of the filter decreases.

(4) The audio processing device according to any one of (1) or (3) described above,
in which the adjustment unit calculates the step size by using a maximum value reference of power of the filter estimated by the estimation unit as a numerator, and a sum of the maximum value reference and power of the filter update coefficient multiplied by a constant that sets reaction sensitivity as a denominator.

(5) The audio processing device according to any one of (1) or (4) described above,
in which the adjustment unit adjusts the step size for each tap of the filter.

(6) The audio processing device according to any one of (1) or (5) described above,
in which the adjustment unit calculates the step size for each frequency by using a filter and the filter update coefficient, the filter and the filter update coefficient being calculated independently for each frequency.

(7) The audio processing device according to any one of (1) or (3) described above,
in which the adjustment unit calculates the step size by using a function that causes the step size to be bi-polarized according to a ratio of power of the filter update coefficient to maximum power of the filter.

(8) The audio processing device according to any one of (1) or (3) described above,
in which the adjustment unit calculates the step size by using a sigmoid function corresponding to a ratio of power of the filter update coefficient to maximum power of the filter.

(9) The audio processing device according to any one of (1) or (8) described above,
in which the estimation unit estimates the filter according to a predetermined algorithm.

(10) The audio processing device according to (9) described above,
in which the estimation unit estimates the filter according to an algorithm of any one of LMS, NLMS, APA, or RLS.

(11) An audio processing method including:
an estimation step of estimating a filter representing a transmission characteristic from a speaker where a reference signal is output to a microphone in which the reference signal sneaks;
an adjustment step of adjusting a step size on the basis of a filter update coefficient estimated by the estimation step; and
an update step of updating the filter according to the filter update coefficient and the step size.

(12) An audio processing device including:
an estimation unit that estimates a filter representing a transmission characteristic from a speaker where a reference signal is output to a microphone in which the reference signal sneaks; and
a determination unit that determines double talk on the basis of a ratio of power of a filter update coefficient estimated by the estimation unit to maximum power of the filter.

(13) The audio processing device according to (12) described above,
in which the determination unit detects double talk when the power of the filter update coefficient is comparable to the maximum power of the filter.

(14) An information processing device including:
a speaker that outputs an audio signal;
a microphone that receives the audio signal;
an estimation unit that estimates a filter representing a transmission characteristic from the speaker where a reference signal is output to the microphone in which the reference signal sneaks;
an adjustment unit that adjusts a step size on the basis of a filter update coefficient estimated by the estimation unit;
an update unit that updates the filter according to the filter update coefficient and the step size; and
a processing unit that performs echo cancellation or another audio signal processing by applying the filter.

(15) A computer program described in a computer readable format for causing a computer to function as:
an estimation unit that estimates a filter representing a transmission characteristic from a speaker where a reference signal is output to a microphone in which the reference signal sneaks;

an adjustment unit that adjusts a step size on the basis of a filter update coefficient estimated by the estimation unit; and an update unit that updates the filter according to the filter update coefficient and the step size.

REFERENCE SIGNS LIST

100 Echo canceller
101 Speaker
102 Microphone
103 Adaptive filter
104 Subtraction device
1301 Filter unit
1302 Estimation unit
1303 Adjustment unit
1304 Update unit

The invention claimed is:

1. An audio processing device, comprising:
an estimation unit configured to:
  estimate a filter based on a reference signal, wherein
    the filter represents a transmission characteristic between a speaker and a microphone,
    the reference signal is output by the speaker, and
    the microphone receives a sneak signal based on the reference signal output by the speaker; and
  estimate a filter update coefficient of the transmission characteristic;
an adjustment unit configured to adjust a step size for the filter based on a ratio of a power of the filter update coefficient to a maximum power of the filter; and
an update unit configured to update the filter based on the filter update coefficient and the adjusted step size.

2. The audio processing device according to claim 1, wherein the adjustment unit is further configured to:
adjust the step size such that the step size approaches zero as the ratio of the power of the filter update coefficient to the maximum power of the filter increases, and
adjust the step size such that the step size approaches one as the ratio of the power of the filter update coefficient to the maximum power of the filter decreases.

3. The audio processing device according to claim 1, wherein the adjustment unit is further configured to calculate the step size based on:
a numerator that comprises a maximum value reference of a specific power of the filter, and
a denominator that comprises a sum of the maximum value reference and the power of the filter update coefficient multiplied by a constant that sets reaction sensitivity.

4. The audio processing device according to claim 1, wherein the adjustment unit is further configured to adjust the step size for each tap of the filter.

5. The audio processing device according to claim 1, wherein
the estimation unit is further configured to calculate the filter and the filter update coefficient independently for each frequency of the reference signal, and
the adjustment unit is further configured to calculate the step size for each frequency of the reference signal based on the calculated filter and the calculated filter update coefficient.

6. The audio processing device according to claim 1, wherein
the adjustment unit is further configured to calculate the step size based on the ratio and a function, and
the function causes the step size to be bi-polarized.

7. The audio processing device according to claim 1, wherein the adjustment unit is further configured to calculate the step size based on a sigmoid function corresponding to the ratio of the power of the filter update coefficient to the maximum power of the filter.

8. The audio processing device according to claim 1, wherein the estimation unit is further configured to estimate the filter based on an algorithm.

9. The audio processing device according to claim 8, wherein the estimation unit is further configured to estimate the filter based on one of a least mean square (LMS) algorithm, a normalized-LMS (NLMS) algorithm, an affine projection algorithm (APA), or a recursive least square (RLS) algorithm.

10. An audio processing method, comprising:
estimating a filter based on a reference signal, wherein
  the filter represents a transmission characteristic between a speaker and a microphone,
  the reference signal is output by the speaker, and
  the microphone receives a sneak signal based on the reference signal output by the speaker;
estimating a filter update coefficient of the transmission characteristic;
adjusting a step size for the filter based on a ratio of a power of the filter update coefficient to a maximum power of the filter; and
updating the filter based on the filter update coefficient and the adjusted step size.

11. An audio processing device, comprising:
an estimation unit configured to:
  estimate a filter based on a reference signal, wherein
    the filter represents a transmission characteristic between a speaker and a microphone,
    the reference signal is output by the speaker, and
    the microphone receives a sneak signal based on the reference signal output by the speaker; and
  estimate a filter update coefficient of the transmission characteristic; and
a determination unit configured to determine double talk based on a ratio of a power of the estimated filter update coefficient to a maximum power of the filter.

12. The audio processing device according to claim 11, wherein the determination unit is further configured to detect the double talk based on the power of the filter update coefficient that is comparable to the maximum power of the filter.

13. An information processing device, comprising:
a speaker configured to output a reference signal, wherein the reference signal is an audio signal;
a microphone configured to receive a sneak signal based on the audio signal output by the speaker;
an estimation unit configured to:
  estimate a filter based on the reference signal, wherein
    the filter represents a transmission characteristic between the speaker and the microphone; and
  estimate a filter update coefficient of the transmission characteristic;
an adjustment unit configured to adjust a step size for the filter based on a ratio of a power of the filter update coefficient to a maximum power of the filter;
an update unit configured to update the filter based on the filter update coefficient and the adjusted step size; and
a processing unit configured to execute one of an echo cancellation process or an audio signal process based on the updated filter.

14. An audio processing device, comprising: an estimation unit configured to: estimate a filter based on a reference signal, wherein the filter represents a transmission characteristic between a speaker and a microphone, the reference signal is output by the speaker, and the microphone receives a sneak signal based on the reference signal output by the speaker; and estimate a filter update coefficient of the transmission characteristic; an adjustment unit configured to calculate a step size based on: a numerator that comprises a maximum value reference of a power of the filter, and a denominator that comprises a sum of the maximum value reference and a power of the estimated filter update coefficient multiplied by a constant that sets reaction sensitivity; and an update unit configured to update the filter based on the filter update coefficient and the calculated step size.

* * * * *